US010872148B2

(12) United States Patent
Sankararaman et al.

(10) Patent No.: US 10,872,148 B2
(45) Date of Patent: *Dec. 22, 2020

(54) SYSTEM, METHOD, AND COMPUTER PROGRAM PRODUCT FOR ISOLATING A DEVICE ASSOCIATED WITH AT LEAST POTENTIAL DATA LEAKAGE ACTIVITY, BASED ON USER INPUT

(71) Applicant: McAfee, LLC, San Jose, CA (US)

(72) Inventors: Srinivasan Sankararaman, Banglore (IN); Deepakeswaran Kolingivadi, Bangalore (IN)

(73) Assignee: MCAFEE, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,720

(22) Filed: Feb. 16, 2016

(65) Prior Publication Data

US 2016/0246962 A1    Aug. 25, 2016

Related U.S. Application Data

(63) Continuation of application No. 13/618,312, filed on Sep. 14, 2012, now Pat. No. 9,262,630, which is a (Continued)

(51) Int. Cl.
*G06F 21/00* (2013.01)
*H04L 12/28* (2006.01)
(Continued)

(52) U.S. Cl.
CPC ............ *G06F 21/554* (2013.01); *H04L 63/10* (2013.01); *H04L 63/102* (2013.01);
(Continued)

(58) Field of Classification Search
CPC . H04L 63/1408; H04L 63/145; H04L 63/083; H04L 63/126; H04L 63/1441; H04L 63/20; G06F 21/305; G06F 21/554; G06F 21/56; H04W 12/08; H04W 8/22; H04W 8/24

See application file for complete search history.

(56) References Cited

U.S. PATENT DOCUMENTS 5,905,859 A    5/1999 Holloway et al.
6,108,786 A    8/2000 Knowlson
(Continued)

OTHER PUBLICATIONS

United States Patent and Trademark Office, "Non-Final Office Action," issued in connection with U.S. Appl. No. 13/618,312, dated Sep. 13, 2013, 19 pages.
(Continued)

*Primary Examiner* — Hee Soo Kim
*Assistant Examiner* — Ho T Shiu
(74) *Attorney, Agent, or Firm* — Hanley, Flight & Zimmerman, LLC

(57) ABSTRACT

A system, method, and computer program product are provided for isolating a device associated with at least potential data leakage activity, based on user input. In operation, at least potential data leakage activity associated with a device is identified. Furthermore, at least one action is performed to isolate the device, based on user input received utilizing a user interface.

21 Claims, 6 Drawing Sheets

Related U.S. Application Data continuation of application No. 11/847,185, filed on Aug. 29, 2007, now Pat. No. 8,271,642.

(51) Int. Cl.
*H04L 29/06* (2006.01)
*H04L 9/00* (2006.01)
*H04M 3/16* (2006.01)
*G06F 21/55* (2013.01)

(52) U.S. Cl.
CPC ........ *H04L 63/145* (2013.01); *H04L 63/1416* (2013.01); *H04L 63/1441* (2013.01); *G06F 2221/034* (2013.01); *H04L 63/1408* (2013.01)

(56) References Cited

U.S. PATENT DOCUMENTS

| | | | |
|---|---|---|---|
| 6,400,265 B1 | 6/2002 | Saylor et al. | |
| 6,470,384 B1 | 10/2002 | O'Brien et al. | |
| 6,981,142 B1 | 12/2005 | Gulcu | |
| 6,990,591 B1 | 1/2006 | Pearson | |
| 7,010,807 B1 | 3/2006 | Yanovsky | |
| 7,058,709 B2 | 6/2006 | Lamberton et al. | |
| 7,304,570 B2 | 12/2007 | Thomas et al. | |
| 7,571,483 B1* | 8/2009 | Bascle | H04L 63/1408 726/24 |
| 7,584,201 B2 | 9/2009 | Casey | |
| 7,752,317 B1 | 7/2010 | Cox et al. | |
| 7,930,538 B1 | 4/2011 | Israel et al. | |
| 8,751,560 B2* | 6/2014 | Oikarinen | G06F 9/5027 709/201 |
| 9,027,135 B1* | 5/2015 | Aziz | H04L 63/1408 726/23 |
| 9,262,630 B2 | 2/2016 | Sankararaman et al. | |
| 2002/0007453 A1 | 1/2002 | Nemovicher | |
| 2002/0069355 A1 | 6/2002 | Garrison | |
| 2002/0078366 A1 | 6/2002 | Raice | |
| 2002/0116627 A1 | 8/2002 | Tarboton et al. | |
| 2003/0040932 A1 | 2/2003 | Sato | |
| 2003/0065934 A1 | 4/2003 | Angelo et al. | |
| 2003/0105973 A1* | 6/2003 | Liang | G06F 21/56 726/24 |
| 2003/0120935 A1 | 6/2003 | Teal et al. | |
| 2003/0133450 A1 | 7/2003 | Baum | |
| 2003/0217150 A1 | 11/2003 | Roese et al. | |
| 2003/0217151 A1 | 11/2003 | Roese et al. | |
| 2004/0098482 A1 | 5/2004 | Asano | |
| 2004/0117640 A1* | 6/2004 | Chu | H04L 63/145 713/188 |
| 2004/0162066 A1 | 8/2004 | Kuchibhotla et al. | |
| 2004/0205419 A1 | 10/2004 | Liang et al. | |
| 2005/0022005 A1 | 1/2005 | McKeeth | |
| 2005/0044404 A1 | 2/2005 | Bhansali et al. | |
| 2005/0050336 A1 | 3/2005 | Liang et al. | |
| 2005/0071670 A1 | 3/2005 | Hafeman | |
| 2005/0083171 A1 | 4/2005 | Hamilton | |
| 2005/0160277 A1 | 7/2005 | Sciupac | |
| 2005/0186954 A1* | 8/2005 | Kenney | H04M 1/67 455/420 |
| 2005/0204162 A1* | 9/2005 | Rayes | H04L 61/2061 726/5 |
| 2005/0235360 A1 | 10/2005 | Pearson | |
| 2005/0269404 A1 | 12/2005 | Landwirth et al. | |
| 2006/0153204 A1 | 7/2006 | Wang et al. | |
| 2006/0212932 A1* | 9/2006 | Patrick | H04L 63/1441 726/11 |
| 2006/0224742 A1 | 10/2006 | Shahbazi | |
| 2006/0236390 A1 | 10/2006 | Matovsky et al. | |
| 2006/0259974 A1 | 11/2006 | Marinescu et al. | |
| 2006/0272034 A1 | 11/2006 | Bhansali et al. | |
| 2006/0278694 A1 | 12/2006 | Jha et al. | |
| 2007/0030539 A1* | 2/2007 | Nath | G06F 21/305 358/520 |
| 2007/0037566 A1 | 2/2007 | D'Agostino et al. | |
| 2007/0039047 A1* | 2/2007 | Chen | H04L 63/20 726/22 |
| 2007/0083928 A1 | 4/2007 | Mattsson et al. | |
| 2007/0094539 A1 | 4/2007 | Nakatuska et al. | |
| 2007/0101124 A1 | 5/2007 | Pitts | |
| 2007/0143824 A1 | 6/2007 | Shahbazi | |
| 2007/0169174 A1 | 7/2007 | Critten et al. | |
| 2007/0178881 A1 | 8/2007 | Teunissen et al. | |
| 2007/0232265 A1* | 10/2007 | Park | H04L 63/104 455/410 |
| 2007/0250627 A1 | 10/2007 | May et al. | |
| 2007/0271611 A1 | 11/2007 | Kwan | |
| 2007/0300300 A1 | 12/2007 | Guo et al. | |
| 2008/0025229 A1 | 1/2008 | Beliles et al. | |
| 2008/0033882 A1 | 2/2008 | Kafkarkou et al. | |
| 2008/0034224 A1 | 2/2008 | Ferren et al. | |
| 2008/0068150 A1 | 3/2008 | Nguyen et al. | |
| 2008/0115226 A1 | 5/2008 | Welingkar et al. | |
| 2008/0160960 A1* | 7/2008 | ElRif | H04M 11/007 455/411 |
| 2008/0209506 A1 | 8/2008 | Ghai et al. | |
| 2008/0295171 A1 | 11/2008 | Singh et al. | |
| 2008/0300300 A1 | 12/2008 | Lan et al. | |
| 2009/0079580 A1 | 3/2009 | Kaplan et al. | |

OTHER PUBLICATIONS

United States Patent and Trademark Office, "Final Office Action," issued in connection with U.S. Appl. No. 13/618,312, dated Jan. 31, 2014, 13 pages.

United States Patent and Trademark Office, "Non-Final Office Action," issued in connection with U.S. Appl. No. 13/618,312, dated Aug. 28, 2014, 12 pages.

United States Patent and Trademark Office, "Final Office Action," issued in connection with U.S. Appl. No. 13/618,312, dated Jan. 26, 2015, 23 pages.

United States Patent and Trademark Office, "Non-Final Office Action," issued in connection with U.S. Appl. No. 13/618,312, dated Jun. 29, 2015, 28 pages.

United States Patent and Trademark Office, "Notice of Allowance and Fee(s) Due," issued in connection with U.S. Appl. No. 13/618,312, dated Oct. 13, 2015, 31 pages.

United States Patent and Trademark Office, "Non-Final Office Action," issued in connection with U.S. Appl. No. 11/847,185, dated Jul. 24, 2009, 34 pages.

United States Patent and Trademark Office, "Final Office Action," issued in connection with U.S. Appl. No. 11/847,185, dated Mar. 12, 2010, 36 pages.

United States Patent and Trademark Office, "Advisory Action," issued in connection with U.S. Appl. No. 11/847,185, dated Jul. 14, 2010, 4 pages.

United States Patent and Trademark Office, "Non-Final Office Action," issued in connection with U.S. Appl. No. 11/847,185, dated Oct. 18, 2010, 14 pages.

United States Patent and Trademark Office, "Non-Final Office Action," issued in connection with U.S. Appl. No. 11/847,185, dated Jun. 3, 2011, 15 pages.

United States Patent and Trademark Office, "Final Office Action," issued in connection with U.S. Appl. No. 11/847,185, dated Oct. 27, 2011, 13 pages.

United States Patent and Trademark Office, "Notice of Allowance and Fee(s) Due," issued in connection with U.S. Appl. No. 11/847,185, dated Jun. 25, 2012, 11 pages.

* cited by examiner

SYSTEM, METHOD, AND COMPUTER PROGRAM PRODUCT FOR ISOLATING A DEVICE ASSOCIATED WITH AT LEAST POTENTIAL DATA LEAKAGE ACTIVITY, BASED ON USER INPUT

CROSS-REFERENCE TO RELATED APPLICATION

This application is a continuation of U.S. patent application Ser. No. 13/618,312, filed Sep. 14, 2012, which is a continuation of U.S. patent application Ser. No. 11/847,185, filed Aug. 29, 2007, which is incorporated herein by reference.

FIELD OF THE INVENTION

The present invention relates to network security, and more particularly to data leakage prevention.

BACKGROUND

Security professionals today face a daunting challenge, protecting an organization's most valuable asset, its information, amidst widespread investment in new, more efficient communication technologies. As organizations invest in new business systems and processes to exchange critical information to, from and about customers, partners, and employees in real time, more opportunity exists for information leaks. Data breaches are rapidly becoming the forerunner of IT security concerns, in part because of the increase in both the frequency and severity of such breaches. For security professionals, the pressure to provide data security is influenced by a number of factors including regulatory compliance, protecting confidential data, and mitigating the risk and associated cost of a breach.

Data leakage prevention (DLP), or data loss prevention, is a computer security term referring to a technology designed to detect and prevent the unauthorized transmission of information from systems of an organization to unauthorized users. Network-based solutions typically integrate with or include endpoint technologies to discover, monitor, and protect information. However, to date, action based solutions have not been user configurable or selectable.

There is thus a need for overcoming these and/or other issues associated with the prior art.

SUMMARY

A system, method, and computer program product are provided for isolating a device associated with at least potential data leakage activity, based on user input. In operation, at least potential data leakage activity associated with a device is identified. Furthermore, at least one action is performed to isolate the device, based on user input received utilizing a user interface.

DETAILED DESCRIPTION

Figure 1:
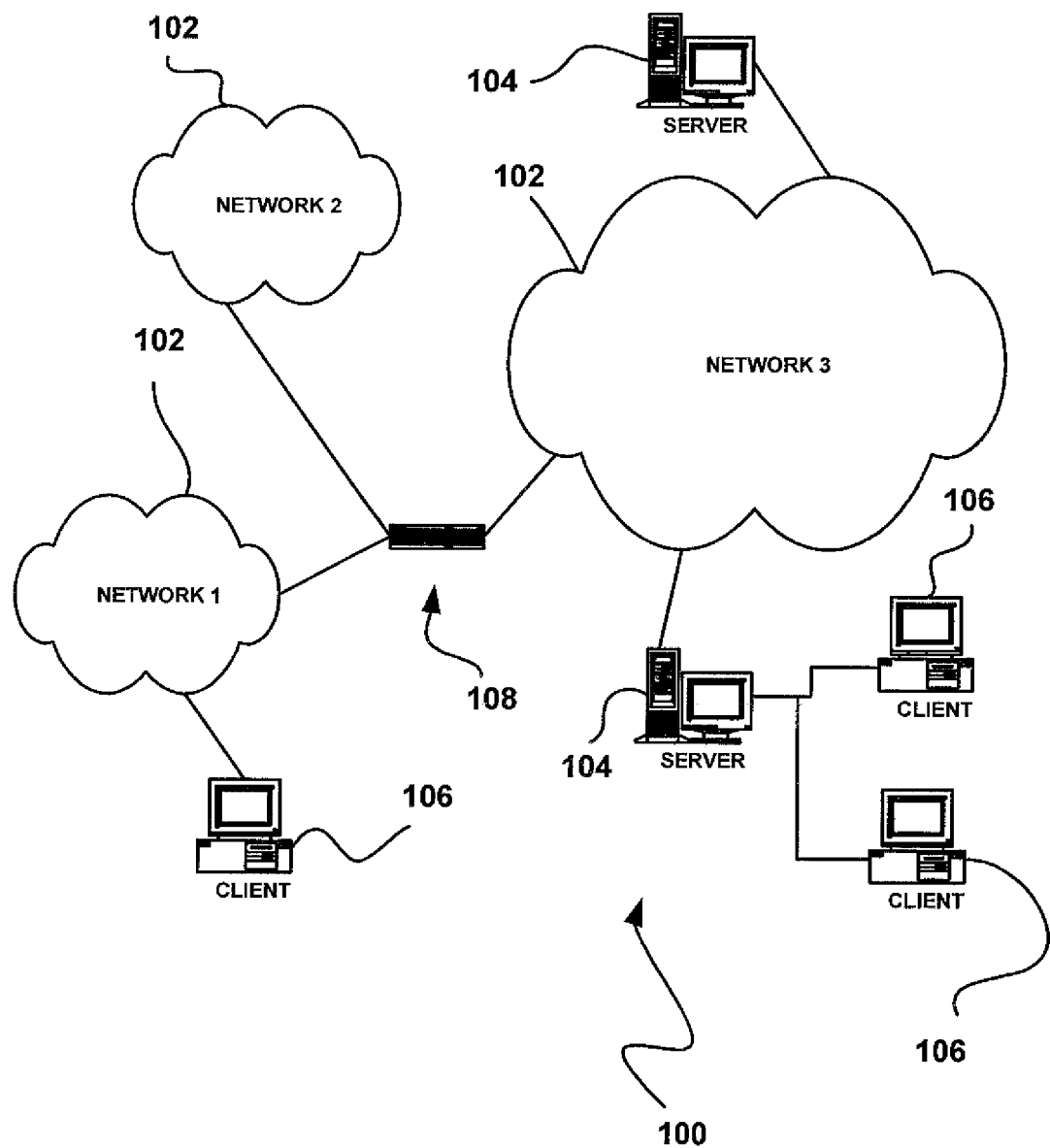
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
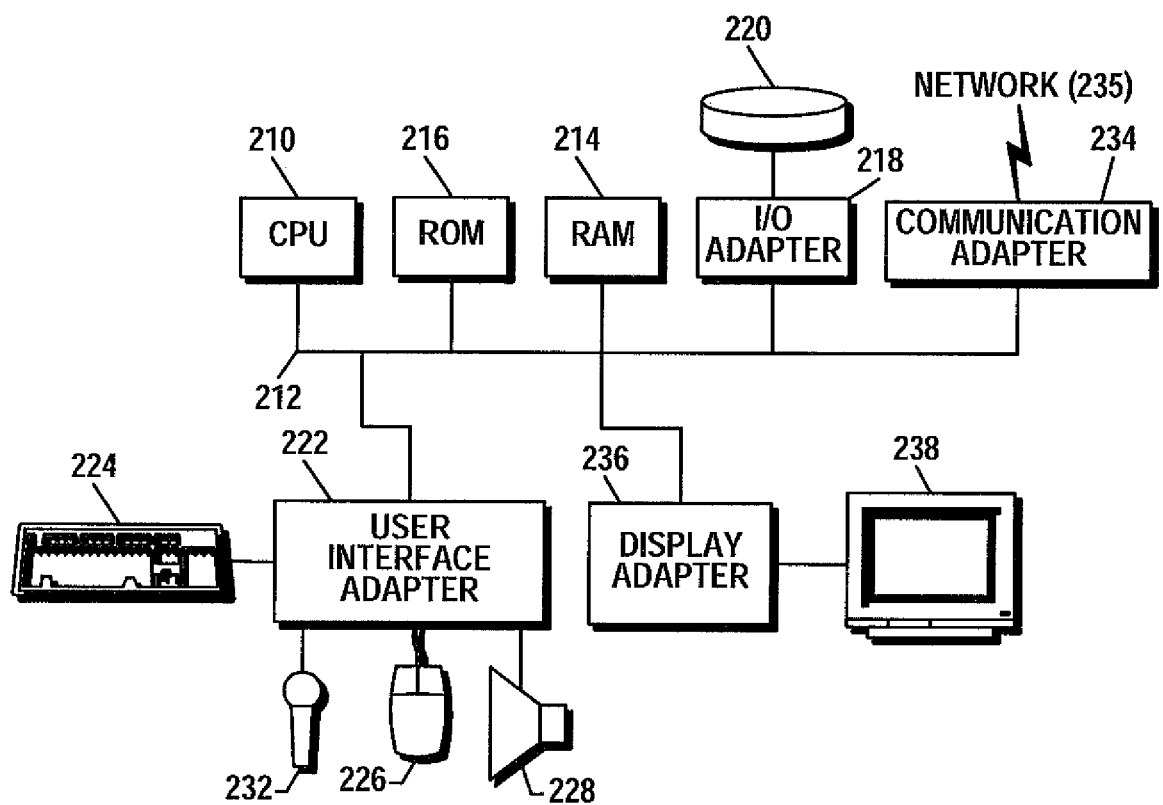
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
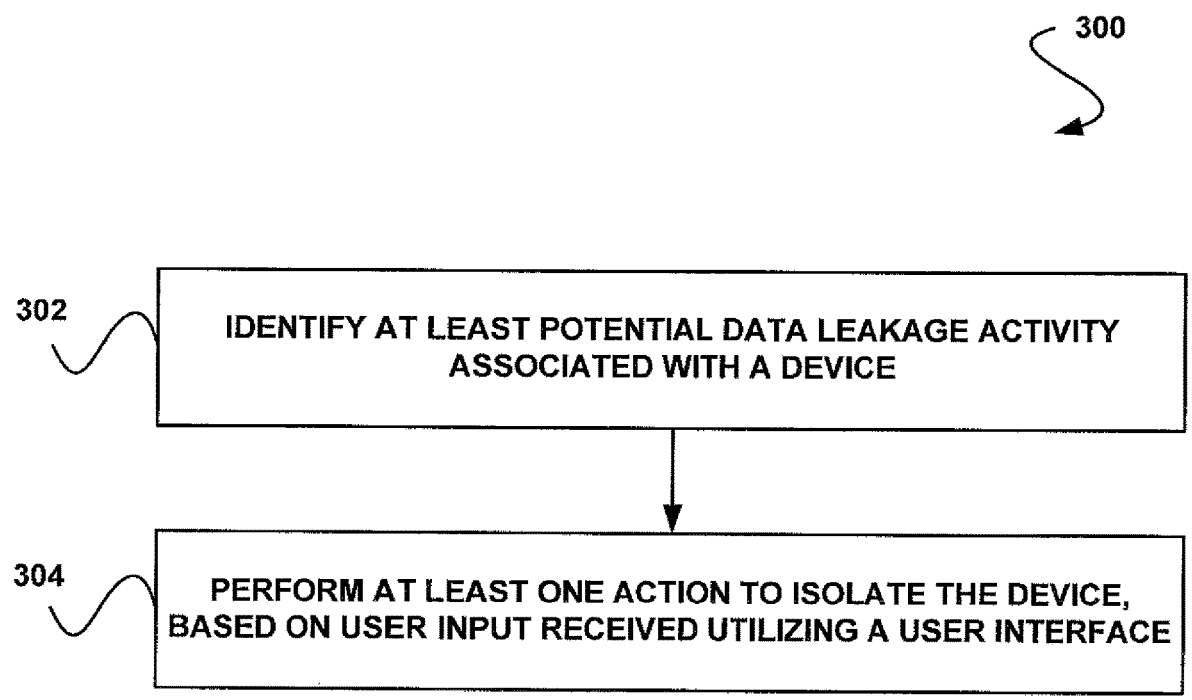
FIG. 3 shows a method for isolating a device associated with at least potential data leakage activity, based on user input, in accordance with one embodiment.

FIG. 3 shows a method 300 for isolating a device associated with at least potential data leakage activity, based on user input, in accordance with one embodiment. As an option, the method 300 may be implemented in the context of the architecture and environment of FIGS. 1 and/or 2. Of course, however, the method 300 may be carried out in any desired environment.

As shown, at least potential data leakage activity associated with a device is identified. See operation 302. In the context of the present description, at least potential data leakage activity refers to any activity where data becomes accessible to an unauthorized user or system, or at least an activity that has a potential for such accessibility. For example, in various embodiments, data leakage activity may include, but is not limited to transferring information (e.g. emails, file transfers, instant messages, etc.), accessing information (e.g. accessing directories, folders, files, etc.), copying information, and/or any other activity that meets the above definition.

Furthermore, in the context of the present description, a device refers to any device capable of sending, receiving, and/or displaying information. For example, in various embodiments, the device may include, but is not limited to client computers, servers, storage units (e.g. flash storage drives, removable hard drives, etc.), PDAs, mobile devices (e.g. computers, phones, storage units, etc.), and/or any other device that meets the above definition.

In one embodiment, the at least potential data leakage activity may be identified by a data leakage detection agent. As an option, the agent may include a network, or gateway based agent for identifying the at least potential data leakage activity. In this case, such network agent may be a hardware/software platform installed at a network connection to analyze network traffic and search for data leakage activity.

As another option, the agent may include a host based agent for identifying the at least potential data leakage activity. In this case, the host based agent may be a software application on a device or node (e.g. a computer, server, router, etc.). In other various embodiments, the agent may be any software application or hardware device/node capable of detecting data leakage activity.

Furthermore, at least one action is performed to isolate the device, based on user input received utilizing a user interface. See operation 304. In the context of the present description, an action refers to any act performed to isolate the device. For example, in various embodiments, the action may include, but is not limited to locking down or disabling a device, blocking or restricting access to information, quarantining a device using a policy enforcement server (e.g. a McAfee® Policy Enforcer, McAfee® ePolicy Orchestrator, a general policy enforcement server, etc.), and/or any other action that meets the above definition.

In one embodiment, the user input may be received subsequent to the identification of the at least potential data leakage activity. For example, upon the identification of at least potential data leakage activity, a user may provide input, using the user interface, from which the at least one action may be based. Strictly as an option, the at least one action may be selected from a plurality of potential actions using the user interface.

In another embodiment, the user input may be received prior to the identification of the at least potential data leakage activity. For example, a user may pre-configure the user input prior to the identification of the at least potential data leakage activity. In this case, the user may pre-configure the user input using the user interface.

It should be noted that the user input may include any information from which the action to be performed may be based. For example, in various embodiments, the user input may include, but is not limited to a plurality of actions or potential actions to be performed, settings for a system or device, system configuration information, and/or any other information from which the action to be performed may be based.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
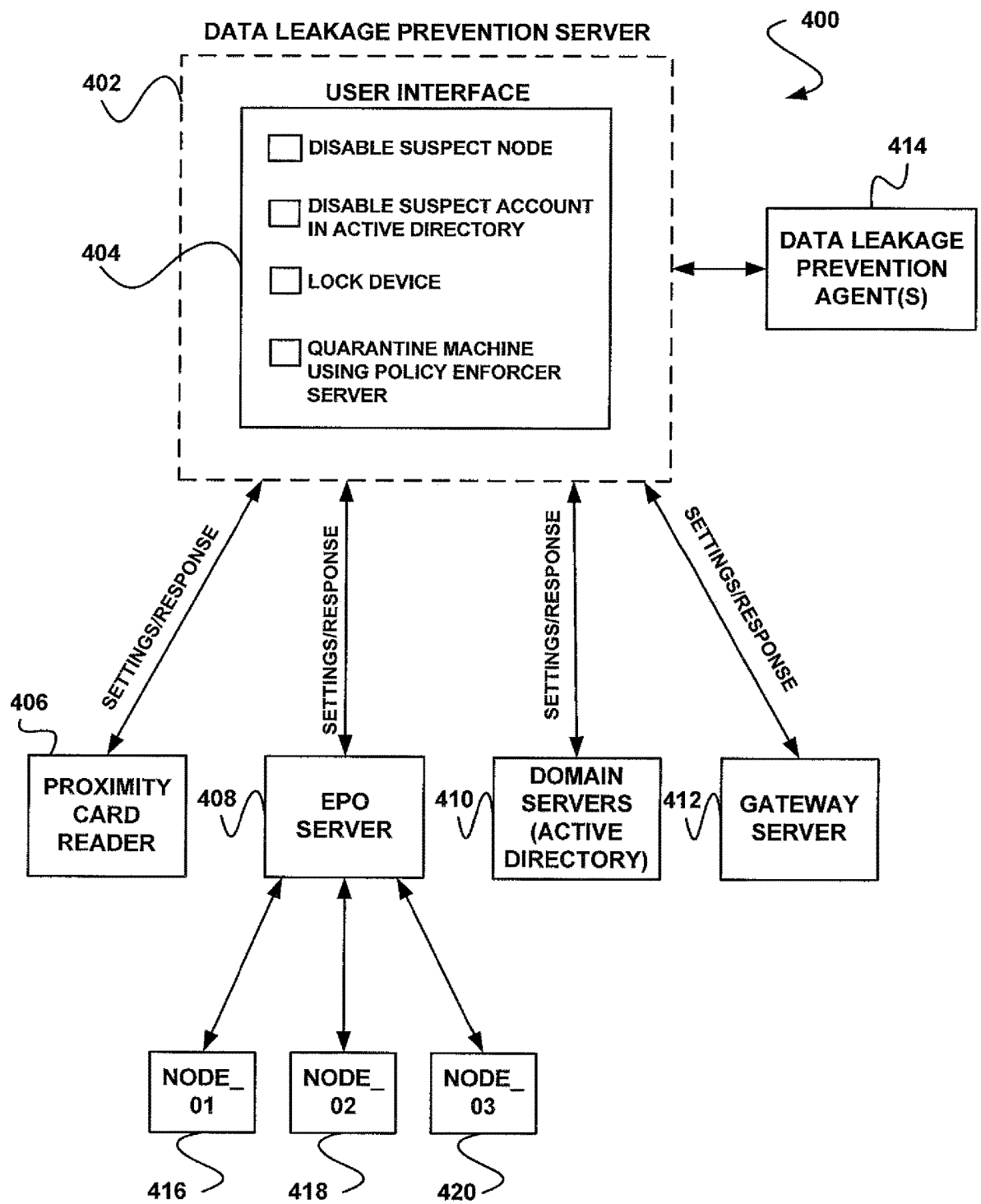
FIG. 4 shows a system for isolating a device associated with at least potential data leakage activity, based on user input, in accordance with one embodiment.

FIG. 4 shows a system 400 for isolating a device associated with at least potential data leakage activity ("potential data leakage activity"), based on user input, in accordance with one embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a data leakage prevention (DLP) server 402 is provided. As shown further, the DLP server 402 is in communication with a proximity card reader 406, an ePolicy orchestrator (EPO) server 408, domain servers 410, and a gateway server 412. Additionally, the DLP server 402 is in communication with at least one DLP agent 414. Furthermore, the EPO server 408 is in communication with a plurality of nodes 416-420. It should be noted that, in other embodiments, the EPO server 408 may represent any general policy enforcement server.

In operation, a potential data leakage associated with a device is detected by at least one of the DLP agents 414. It should be noted that, although the DLP agents 414 are shown as independent agents, in various embodiments the DLP agents 414 may be included with the proximity card reader 406, the EPO server 408, the domain servers 410, and/or the gateway server 412. Additionally, the DLP agents 414 may be included with host devices, client devices, the nodes 416-420, and/or any other device capable of including the DLP agents 414.

It should also be noted that the nodes 416-420 may represent any device that may be connected to a network. For example, the nodes 416-420 may include computers, PDAs, mobile devices, routers, switches, hubs, and or any other device that may be connected to a network. In one embodiment, the nodes 416-420 may include the device from which the potential data leakage is associated.

Once a potential data leakage is detected, at least one action is performed to isolate the device, based on user input received utilizing a user interface 404. For example, upon detection of a potential data leakage, at least one of the DLP agents 414 may alert the DLP server 402 of the potential data leakage. In one embodiment, alerting the DLP server may include sending information relating to the potential data leakage such as current system or network hardware/software settings, information about a medium on which the potential leakage occurred, information about the device, response information or suggested actions to be taken, and/or any other information relating to the potential data leakage.

Strictly as an option, a user may also be alerted of the potential data leakage. In the context of the present description, a user refers to any individual capable of receiving an alert. For example, in various embodiments, the user may include, but is not limited to an administrator, a manager, a supervisor, an information security officer, and/or any other individual that meets the above definition.

The user may be alerted in a variety of ways. For example, the user may be alerted on a user device (e.g. a computer, PDA, mobile phone, etc.), via email, a text message, a graphic alert, and/or by any other type of alert. In one embodiment, the user may be alerted by a graphic user interface (GUI). As an option, the user interface 404 may alert the user.

As shown, the user interface 404 may provide a user with a plurality of potential actions to perform to isolate the device. For example, in various embodiments, the potential actions may include, but are not limited to restricting access to a network using the gateway server 412, disabling at least one node which is a suspect for the potential data leakage, disabling an account in an active directory of the domain server 410 (e.g. a suspect user account), locking out the device, quarantining a device using the EPO server 408 or another policy enforcement server, blocking access to an area or building using the proximity card reader 406, and/or any other action which may be used to isolate the device.

In one embodiment, the user interface 404 may display information related to the potential data leakage. In this case, any information provided by the DLP agents 414 may be displayed to the user. Thus, the user may utilize this information to determine the action to be performed to isolate the device.

As an option, the information provided by the DLP agents 414 may be used to automatically select a default action on the user interface 404. For example, the DLP server 402 may utilize the information provided by the DLP agents 414 to select a default action or determine a suggested action for the user. In this case, the user may have the option to select the default action or a different action.

It should be noted that, although the user interface 404 is illustrated with check boxes for selecting the potential actions, this is only one optional layout and should not be construed as limiting in any manner. In various other embodiments, the user interface 404 may include a drop down menu of potential actions, a list of potential actions and a command line input, a hyperlinked list, and/or any other layout for presenting the potential actions. Furthermore, the user interface 404 may include different levels of security actions.

For example, each potential action may be divided into subparts based on a ascertained threat level. For example, under an access category (e.g. building access, area access, etc.), there may be subcategories listing different areas and/or buildings where access may be restricted using the proximity card reader 406. Thus, the user may select to restrict access to only certain areas and/or buildings based on the threat. Similarly, the user may have the option to restrict access to only certain directories and or files using the user interface.

Once the user selects an action to isolate the device, settings corresponding to the action are sent to the proximity card reader 406, the EPO server 408, the domain servers 410, the gateway server 412, the DLP agents 414, the nodes 416-420, and/or any other device corresponding to the action. The settings may include any settings, parameters, or other information such that the action may be performed. In one embodiment, the settings may be predetermined settings based on the selected action.

In another embodiment, the user may configure the settings using the user interface 404. In such case, the settings may be included on the user interface 404. Further information and details regarding the communication of the settings to the DLP agent or other devices, in accordance with one optional embodiment, may be found in U.S. Pat. No. 6,470,384 entitled "MODULAR FRAMEWORK FOR CONFIGURING ACTION SETS FOR USE IN DYNAMICALLY PROCESSING NETWORK EVENTS IN A DISTRIBUTED COMPUTING ENVIRONMENT" issued Oct. 22, 2002, which is incorporated herein by reference in its entirety.

Once the settings are sent to the devices corresponding to the action or any other relevant devices, the devices may send a response indicating a reception and/or a successful configuration based on the settings. In one embodiment, the response may include a response alert displayed to the user. For example, the user interface 404 may contain a list of devices receiving the settings. In this case, the response alert may include an indicator corresponding to each of the devices receiving the settings (e.g. a success or failure indicator).

In one embodiment, the user may pre-configure actions to be taken in response to a data leakage using the user interface 404. For example, the user may use the user interface 404 to select different settings and/or actions to correspond to different data leakage activities. In this case, upon the identification of the potential data leakage, the DLP server may automatically respond with an action based on the pre-configured user input. This may occur in conjunction with, or independently of, notifying the user of the potential data leakage.

Figure 5:
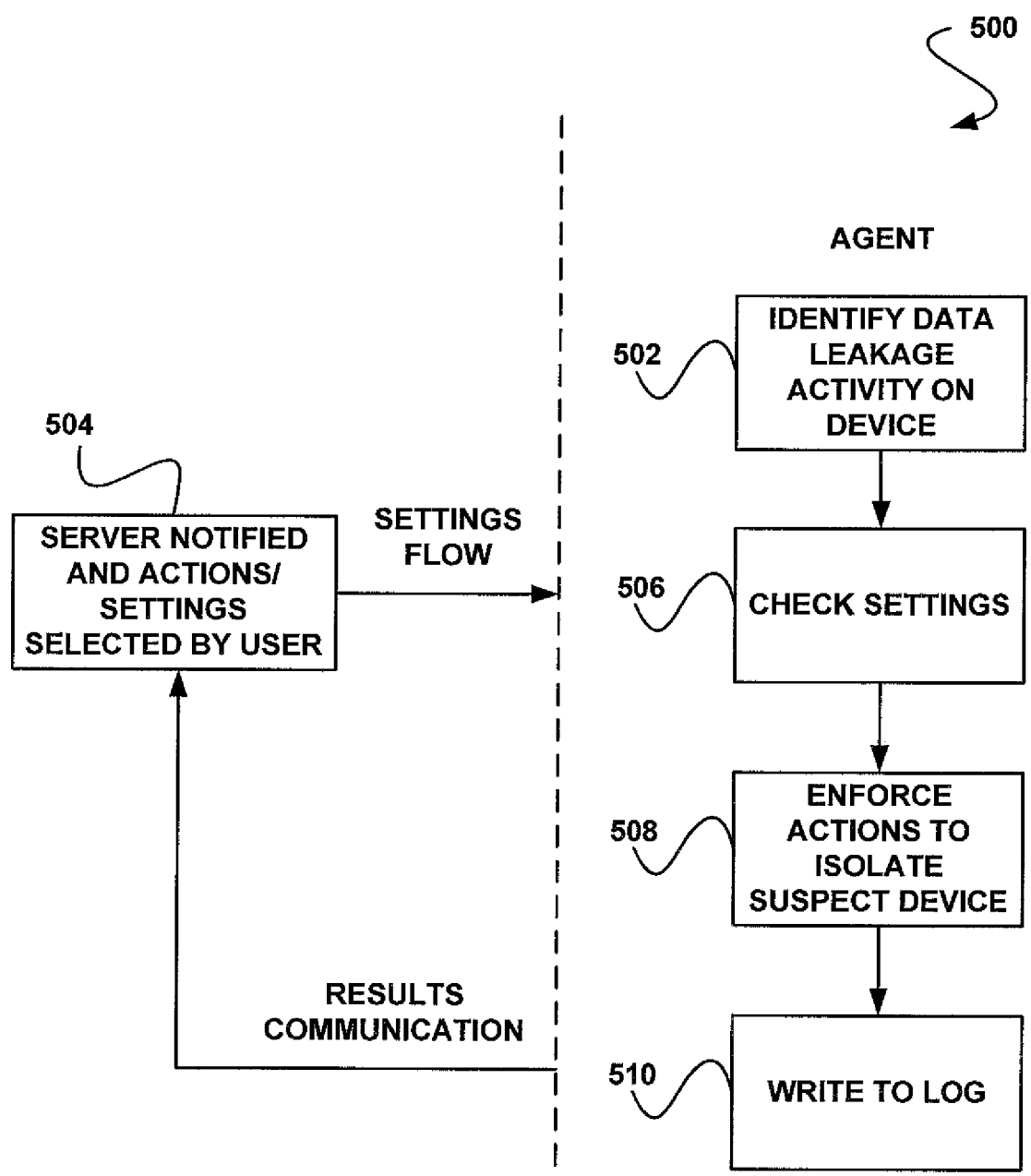
FIG. 5 shows a method for isolating a device associated with at least potential data leakage activity, based on user input, in accordance with another embodiment.

FIG. 5 shows a method 500 for isolating a device associated with at least potential data leakage activity, based on user input, in accordance with another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown, an agent identifies a data leakage activity on a device. See operation 502. Furthermore, a server is notified of the data leakage activity, and a user selects at least one action to be performed to isolate the device. See operation 504. The action to be performed may correspond to settings of a system, or policy settings, to be used to isolate the device.

For example, the settings may include access settings to lock down the device, block access to an area, disable directory access, quarantine the device, disconnect connectivity to a network for a particular node, and/or any other settings corresponding to an action. It should be noted that the settings may be predetermined settings or settings configured by the user in response to the potential data leakage. For example, the user may have the option to select from a list of actions which include predetermined settings. In another embodiment, the user may have an option to configure the settings of the list of actions.

Additionally, the agent may check current policy and/or device settings. See operation 506. In one embodiment, the agent may check the current policy settings and, in turn, send the current settings to the server. In another embodiment, the agent may receive settings from the server and subsequently check the current policy settings to determine how to implement the settings received by the server. Once the agent has received the settings/action to be performed, the agent performs or enforces the actions to isolate the suspect device. See operation 508.

Additionally, information about the data leakage and/or action is written to a log. See operation 510. In various embodiments, the information about the data leakage may include, but is not limited to current policy settings, information about a medium on which the leakage or potential leakage occurred, information about the suspect device, information on the selected action, and/or any other information relating to the potential data leakage and/or action.

As an option, the log may be stored in a database. In one embodiment, the log may be stored on the server. In addition to writing the log, results of the enforced action may be sent to the server. In various embodiments, the results may include a success or failure indication of the action and any information written to the log.

Using the results of the action, the user may have an option to select another action to isolate the suspect device. For example, if the results indicate that the settings of a first action selected by the user were unable to be implemented, the user may select a second action to isolate the suspect device using the user interface. In one embodiment, the second action may be a preconfigured action which the user selected using the user interface prior to the data leakage activity.

Figure 6:
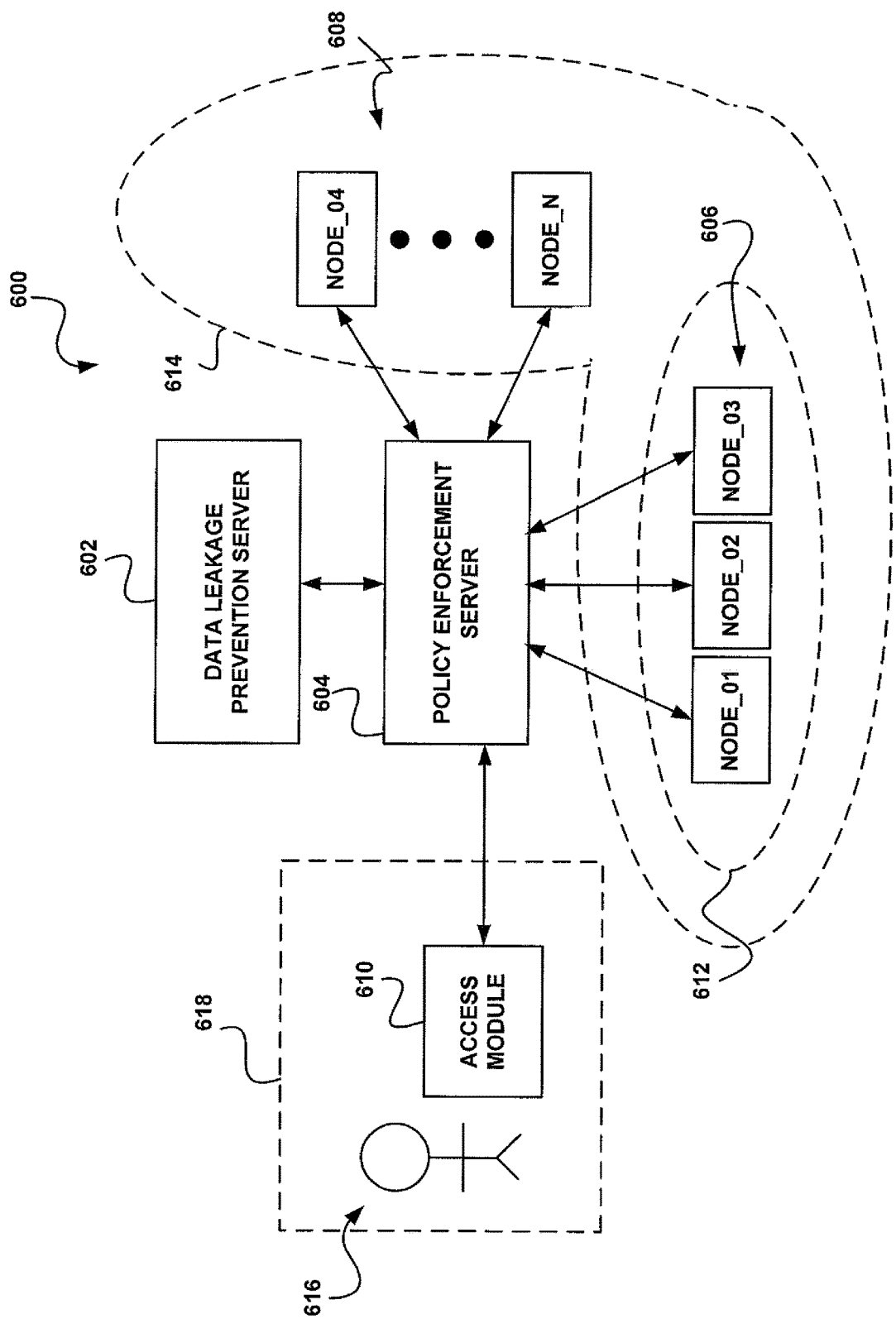
FIG. 6 shows a system for isolating a device associated with at least potential data leakage activity, based on user input, in accordance with another embodiment.

FIG. 6 shows a system 600 for isolating a device associated with at least potential data leakage activity, based on user input, in accordance with another embodiment. As an option, the system 600 may be implemented in the context of the architecture and environment of FIGS. 1-5. Of course, however, the system 600 may be implemented in any desired environment. It should also be noted that the aforementioned definitions may apply during the present description.

As shown, a DLP server 602 is in communication with a policy enforcement server 604 (e.g. an EPO server, general policy enforcement server, etc.). The policy enforcement server 604 is in communication with a plurality of nodes 606 and 608. In addition, the policy enforcement server 604 may be in communication with an access module 610.

In operation, a data leakage associated with a device is detected. The data leakage may have been detected at one on the plurality of nodes 606 and 608 using a leakage detection agent, for example. The DLP server 602 is then notified of the data leakage and alert signals are sent to the nodes 606 and 608.

In the case that a particular suspect node is identified, the suspect node may be monitored for behavior and an intent may be ascertained based on the monitoring. Such monitoring may include, monitoring data transfers, communications, file and directory accesses, and any other behavior which may help ascertain an intent of a user of the suspect node. In one embodiment, the ascertained intent may influence an action to be taken regarding the data leakage activity.

Once the DLP server 602 has been notified, an action is performed to isolate the device. In one embodiment, the isolation may include locking down the device. For example, upon detection of the data leakage, the device (e.g. a computer or other device of a user) may be automatically locked out. In this case, the user may not have the ability to use the device until cleared by an administrator or another individual with proper authorization.

In another embodiment, the action may include restricting access to a physical area. For example, access to a building or room may be blocked due to the detection of a data leakage. In this case, a card reader (or an access module) may be notified to block physical access to an area for a particular individual or suspect. In the context of the present description, a suspect refers to any individual suspected of a data leakage activity.

In still another embodiment, the action may include restricting access to a directory. For example, the action may include disabling an account of a suspect in an active directory server (e.g. a Windows Active Directory server, etc.). In this case, the suspect may be monitored for further data leakage activity.

When it is determined that a data leakage has occurred by the suspect, a message may be sent to the DLP server 602 which, in turn, notifies the active directory server in a particular domain. The account of the suspect may then be disabled. It should be noted that the accounts to be disabled as a result of the data leakage may be configurable by a user using a user interface. In one embodiment, the user may configure the accounts to be disabled in response to the data leakage. In another embodiment, the user may pre-configure the accounts to be disabled using the user interface before the data leakage occurs.

In yet another embodiment, the action may include quarantining the device. For example the device may be quarantined using the policy enforcement server 604. In this case, upon the determination of the data leakage, the DLP server 602 may notify the policy enforcement server 604 which may then quarantine the device and/or prevent access to particular networks.

It should be noted that the access to networks may be restricted based on a configuration set forth by a user using the user interface. In one embodiment, the user may configure access to be restricted in response to the data leakage. In another embodiment, the user may pre-configure the access to be restricted using the user interface before the data leakage occurs. As an option, the user (e.g. an administrator, etc.) may use the user interface to clear access to the restricted network for the suspect.

In one embodiment, the action performed to isolate the device may be selected by a user (e.g. an administrator, etc.) in real-time or near real-time. For example, upon the DLP server 602 being notified, the user may be notified of the data leakage. The user may then select an action to isolate the device using the user interface. In another embodiment, the action to isolate the device may be preconfigured by the user. For example, the user may use the user interface to configure actions in response to data leakage events prior to the occurrence of a data leakage event.

As an option, a human suspect 616 may be isolated as a result of the data leakage. For example, information about the data leakage may indicate that the suspect 616 was the source of the data leakage, and the leakage occurred in an area 618. Thus, the suspect 616 may be blocked from exiting the area 618 and/or entering another area. In one embodiment, the access restriction may be accomplished by sending information to the access module 610 (e.g. a card reader, locking mechanism, etc.) such that the user 616 may be isolated.

In addition, a network area where the suspect node or suspect device exists may be isolated. In this case, the action may be performed on a plurality of devices. For example, it may be determined that the suspect node is in a user group 612 which is included in a total user group 614. In this case, the user group 612 may be disconnected from the network (e.g. a local network and/or the Internet, etc.) while the rest of the total group 614 maintains access to the network.

As an option, a virtual safety network zone may be developed around the isolated group 612. Thus, all traffic flowing out of the isolated group 612 may be monitored, email traffic may be quarantined, and/or any other precautionary measures may be implemented. In this case, the at least one action may include monitoring the plurality of devices for another potential data leakage activity. Furthermore, users associated with the isolated group 612 may be alerted. Thus, the suspect 616 may be further isolated from other users associated with the isolated group 612. In one embodiment, a virtual safety network zone may be developed, based on a data leakage occurrence on a plurality of nodes. For example, if more than one node has shown characteristics of data leakage, the zone may be generated, else only actions, as defined via a user interface, are enforced individually.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for reducing an impact of data leakage activity in a network, comprising:
   generating, by executing an instruction with at least one processor of a first computer, a user prompt including choices for isolating a first node in the network, the user prompt generated in response to detecting a notification that indicates (a) a second computer detected a potential data leakage activity of the first node and (b) a suggested action for isolating the node, at least one of the choices including the suggested action, the first node different than the first computer and the second computer;
   determining, by executing an instruction with the at least one processor of the first computer, the first node is in a group of nodes; and
   in response to detecting the notification, forming an isolated group, by executing an instruction with the at least one processor of the first computer, by causing at least one device to enforce a policy to isolate the first node and ones of the group of nodes that have exhibited characteristics of the potential data leakage activity from the network, the policy including monitoring traffic flowing out of the isolated group to determine whether additional potential data leakage activity is present.

2. The method of claim 1, wherein the choices include an option for user selection representing an action to disable the first node.

3. The method of claim 1, wherein the choices include an option for user selection representing an action to disable an account associated with the first node.

4. The method of claim 1, wherein the choices include an option for user selection representing an action to lock the first node.

5. The method of claim 1, wherein the choices include an option for user selection representing an action to quarantine the first node.

6. The method of claim 1, wherein the first computer includes at least one physical computer.

7. A storage device or storage medium comprising instructions that when executed cause a first computer to at least:
   in response to a notification that indicates (1) a second computer detected a potential data leakage activity on a first node in a network and (2) a suggested action for isolating the first node, generate a user prompt including choices for isolating the first node, at least one of the choices including the suggested action, the first node different than the first computer and the second computer;
   determine the first node is in a group of nodes; and
   in response to detecting the notification, form an isolated group by causing at least one device to enforce a policy to isolate the first node and ones of the group of nodes that have exhibited characteristics of the potential data leakage activity from the network, the policy including monitoring traffic flowing out of the isolated group to determine whether additional potential data leakage activity is present.

8. The storage device or storage medium of claim 7, wherein the choices include an option for user selection representing an action to disable the first node.

9. The storage device or storage medium of claim 7, wherein the choices include an option for user selection representing an action to disable an account associated with the first node.

10. The storage device or storage medium of claim 7, wherein the choices include an option for user selection representing an action to lock the first node.

11. The storage device or storage medium of claim 7, wherein the choices include an option for user selection representing an action to quarantine the first node.

12. The storage device or storage medium of claim 7, wherein the first computer includes at least one physical computer.

13. The storage device or storage medium of claim 7, wherein the first computer includes a mobile device.

14. The storage device or storage medium of claim 13, wherein the mobile device is mobile phone.

15. A system, comprising:
    one or more processors of a first computer; and
    a memory, coupled to the one or more processors, including instructions that, when executed by the one or more processors, cause the one or more processors to at least:
    in response to a notification that indicates (1) a second computer detected a potential data leakage activity on a first node in a network and (2) a suggested action for isolating the first node, generate a user prompt including choices for isolating the first node, at least one of the choices including the suggested action, the first node different than the first computer and the second computer;
    determine the first node is in a group of nodes; and
    in response to detecting the notification, form an isolated group by causing at least one device to enforce a policy to isolate the first node and ones of the group of nodes that have exhibited characteristics of the potential data leakage activity from the network, the policy including monitoring traffic flowing out of the isolated group to determine whether additional potential data leakage activity is present.

16. The system of claim 15, wherein the choices include an option for user selection representing an action to disable the first node.

17. The system of claim 15, wherein the choices include an option for user selection representing an action to disable an account associated with the first node.

18. The system of claim 15, wherein the choices include an option for user selection representing an action to lock the first node.

19. The system of claim 15, wherein the choices include an option for user selection representing an action to quarantine the first node.

20. The system of claim 15, wherein the system includes a mobile device.

21. The system of claim 20, wherein the mobile device is mobile phone.

\* \* \* \* \*